(12) United States Patent
Maeda

(10) Patent No.: US 6,384,512 B1
(45) Date of Patent: May 7, 2002

(54) DRIVING APPARATUS FOR PIEZO-ACTUATOR HAVING ABNORMALITY DETECTING FUNCTION

(75) Inventor: Shinichi Maeda, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/986,052

(22) Filed: Nov. 7, 2001

(30) Foreign Application Priority Data

Dec. 22, 2000 (JP) ........................................ 2000-390472

(51) Int. Cl.[7] .............................. H02N 2/06; H01L 41/09
(52) U.S. Cl. ................................................. 310/316.03
(58) Field of Search ..................................... 310/316.03

(56) References Cited

U.S. PATENT DOCUMENTS 5,130,598 A * 7/1992 Verheyen et al. ...... 310/316.03

FOREIGN PATENT DOCUMENTS

| JP | 1-202177 | 8/1989 | ............ H02N/2/00 |
| JP | 401260333 A | * 10/1989 | ................ 310/314 |
| JP | 3-128679 | 5/1991 | ............ H02N/2/00 |

* cited by examiner

Primary Examiner—Thomas M. Dougherty
(74) Attorney, Agent, or Firm—Nixon & Vanderhye P.C.

(57) ABSTRACT

In a driving apparatus for piezo-stacks, a controller repeats switching operation for turning switching elements on/off to thereby attain a determined piezo-actuator voltage. An abnormality detecting circuit determines abnormality of the piezo-stacks by comparing the number of times of charging and the number of times of discharging, or charging/discharging time periods at this occasion with those at normal time.

3 Claims, 6 Drawing Sheets

DRIVING APPARATUS FOR PIEZO-ACTUATOR HAVING ABNORMALITY DETECTING FUNCTION

CROSS REFERENCE TO RELATED APPLICATION

This application is based on and incorporates herein by reference Japanese Patent Application No. 2000-390472 filed Dec. 22, 2000.

BACKGROUND OF THE INVENTION

The present invention relates to a driving apparatus for a piezo-actuator, particularly to a driving apparatus for a piezo-actuator having an abnormality detecting function.

A piezo-actuator produces displacement in accordance with an applied voltage by expansion and contraction of a piezoelectric body. It provides high response and excellent control performance. Therefore, it is proposed to utilize the piezo-actuator, for instance, a piezo-injector, in a vehicular driving apparatus.

Meanwhile, in recent years, in order to deal with new vehicular regulations, it is necessary to establish a failure diagnosis technology of vehicle-mounted apparatus. In a piezo-actuator which generates a high voltage, it is necessary to stop driving the piezo-actuator swiftly upon occurrence of abnormality.

As a countermeasure against high voltage of a piezo-actuator, an abnormality detecting circuit is provided in a driving apparatus for a piezo-actuator. For example, JP-A-3-128679 discloses a driving apparatus which applies a high voltage for a predetermined time period in contracting a piezo-actuator and discharges accumulated electric charge. This apparatus detects whether the discharging has been completed. When the discharging has not been completed, supply of high voltage is prohibited thereafter and electric charge of the actuator is discharged. The apparatus thus ensures safety by discharging electric charge when some abnormality occurs in driving the actuator.

Further, it is proposed to detect a voltage level (or current) of an output terminal controlled by ON/OFF signals and determine abnormality based thereon. That is, when a terminal of a suck-in output is turned on, the voltage level is L level. When turned off, it is H level. At a flow-out terminal, the condition is reversed. Therefore, by comparing the ON/OFF signal and detected voltage level, abnormality can be determined. When abnormality is detected based on current, abnormality is determined by whether the current reaches a prescribed current at ON/OFF-time. Further, when abnormality is detected, high voltage generating operation is prohibited and the abnormality is displayed.

However, there are various abnormal situations such as disconnection or short-circuit of an output terminal, disconnection, partial disconnection or short-circuit, current leakage of a piezo-actuator and the like. Particularly, in the case of a switching method of carrying out charge and discharge in stages, it is also likely that charge and discharge are carried out by interruption caused by contact failure of wires. Thus, a number of circuits are needed to deal with all possible abnormalities. A piezo-injector for multi-cylinder engine is provided with output terminals of both of flow-out output and suck-in output, and circuits for a number of cylinders are needed. Therefore, the circuit construction becomes complicated and cost is increased.

SUMMARY OF THE INVENTION

It is an object thereof to provide a driving apparatus for a piezo-actuator capable of easily and accurately detecting abnormality without complicating a circuit construction or increasing cost.

According to the present invention, a driving apparatus for a piezo-actuator detects abnormality by detecting either or both of the numbers of times of switching in charging and in discharging and charging/discharging time periods and comparing the detection results with those in normal time.

In driving the piezo-actuator, a charging or the discharging switching element is controlled to be turned on/off such that currents flowing in charging and discharging are constant and the numbers of times of switching in charging and in discharging are equal to each other and become a substantially constant prescribed number of times. However, when some abnormality occurs in charging/discharging paths, this relationship does not hold. Therefore, the abnormality can be determined when the numbers of times of switching in charging and in discharging are considerably smaller or larger than the prescribed number of times, or when a difference between the numbers of times of switching in charging and in discharging is large. Further, charging/discharging time periods also become a substantially predetermined time period. Therefore, when the predetermined time period is considerably exceeded, abnormality can be determined. The abnormality can be determined comparatively easily based on the numbers of times of switching in charging and in discharging, or the charging/discharging time periods. Thus, a complicated detecting circuit is not needed and cost is not increased.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
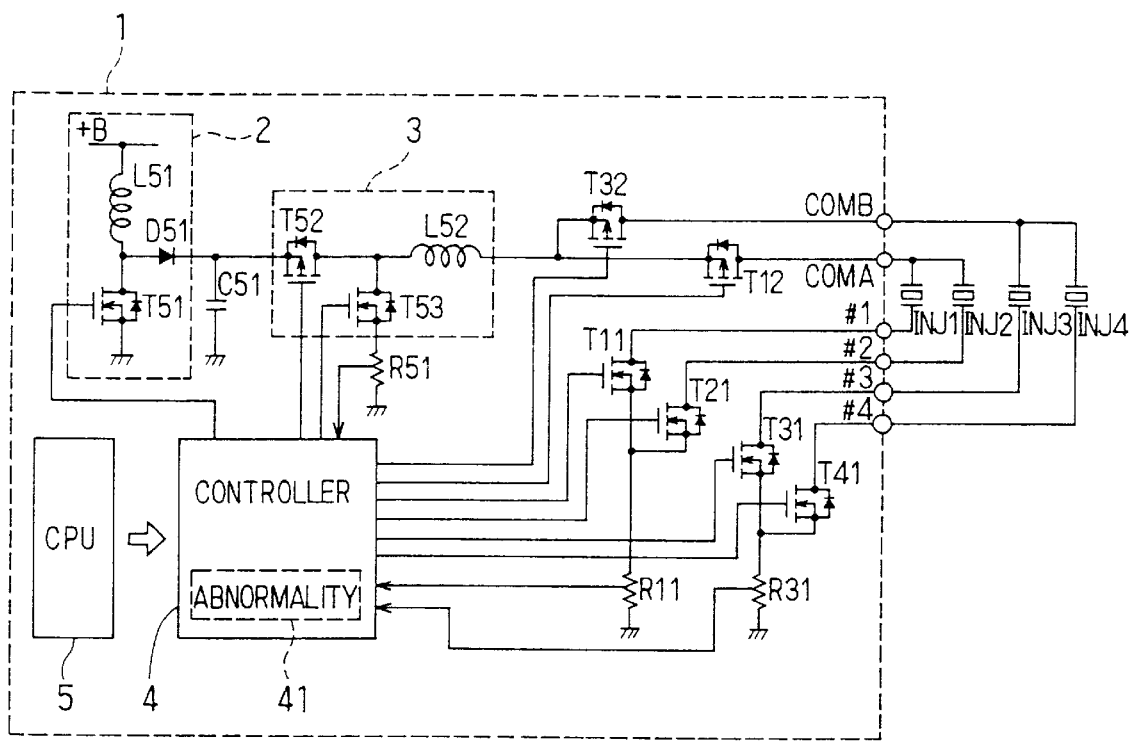
FIG. 1 is a circuit diagram showing a driving apparatus for a piezo-actuator according to an embodiment of the present invention.

The present invention will be described in detail with reference to an embodiment shown in the drawings.

Referring first to FIG. 1, a driving apparatus 1 is provided for piezo-injectors INJ1 through INJ4 which comprises piezo-stacks for driving four injectors mounted in correspondence with respective cylinders (#1 through #4). Each of the piezo-stacks INJ1 through INJ4 has a structure in which piezoelectric bodies such as PZT expanded by injecting electric charge and contracted by removing electric charge are formed in a shape of a circular or rectangular thin plate, laminated and integrated. A number of the piezoelectric bodies are electrically connected in parallel as a piezo-stack. Positive electrodes and negative electrodes are provided alternately among the piezoelectric bodies. The positive electrodes and the negative electrodes are connected to outside via a positive electrode and a negative electrode formed at side faces of the stacked body.

The driving apparatus 1 is provided with a voltage boosting circuit (DC—DC) 2 constituting high voltage generating means for generating a high voltage applied to the piezo-stacks INJ1 through INJ4 and a charge/discharge circuit 3 constituting charging/discharging means for controlling to charge and discharge energy generated by the voltage boosting circuit 2 to and from the piezo-stacks INJ1 through INJ4.

The voltage boosting circuit 2 is constructed by an inductance L51, a switching element T51, and a diode D51 for generating direct current voltage of several tens through several hundreds volts by being supplied with electric power from a battery (+B) and storing the direct current voltage in a capacitor C51.

The charging/discharging circuit 3 is provided with a charging switching element T52 and a discharging switching element T53 both of which are constructed by MOSFETs. When the charging switching element T52 is turned on, the high voltage generated by the voltage boosting circuit 2 is applied to the piezo-stacks INJ1 through INJ4. When the discharging switching element T53 is turned on, electric charge stored in the piezo-stacks INJ1 through INJ4 is discharged. The circuit 3 includes an inductance L52 for restricting current and recovering energy in charging and discharging.

The driving apparatus 1 is also provided with cylinder switching elements T11, T21, T31 and T41 for selecting the piezo-stacks INJ1 through INJ4 constituting objects for driving and bank switching elements T12 and T32. Further, the piezo-stacks INJ1 through INJ4 are selected by turning on/off the cylinder switching elements T11 through T41 respectively connected in series with the piezo-stacks INJ1 through INJ4 and the bank switching elements T12 common to the piezo-stacks INJ1 and INJ2 and the bank switching element T32 common to the piezo-stacks INJ3 and INJ4. The bank switching elements T12 and T32 are for separating two of the piezo-stacks, so that remaining two of the piezo-stacks operates properly when any of the piezo-stacks INJ1 through INJ4 is brought into an uncontrollable state (limp home operation).

The cylinder switching elements T11 through T41 and the bank switching elements T12 and T32 are constructed by MOSFETs and respective gates thereof are applied with control signals respectively from an electronic controller 4 constituting controlling means. The controller 4 turns on the switching elements T11 through T41, T12 and T32 in correspondence with the piezo-stacks INJ1 through INJ4 constituting driving objects based on signals from CPU 5. The controller 4 also applies control signals to gates of the charging switching element T52 and the discharging switching element T53 and turns the switching elements T52 and T53 on/off to thereby control charging/discharging of the piezo-stacks INJ1 through INJ4.

Further, there are provided a detection resistor R11 common to the piezo-stacks INJ1 and INJ2 and a detection resistor R31 common to the piezo-stacks INJ3 and INJ4 for charge control. A charge current of the piezo-stacks INJ1 through INJ4 is detected by applying the voltage across both ends thereof to the controller 4. The discharging switching element T53 is provided with a detection resistor R51 for discharge control. A discharge current of the piezo-stacks INJ1 through INJ4 is detected by applying the voltage across both ends thereof to the controller 4.

The CPU 5 calculates fuel injection amount and timing based on signals from various sensors (not illustrated) and outputs the driving signals of the injectors to the controller 4. The driving signal is a rectangular pulse wave signal in correspondence with an injection time period. The controller 4 starts charging at the rise of the driving signal and starts discharging at fall thereof. For example, when the piezo-stack INJ1 is driven, the charge current flows from the capacitor C51 via the route of the charging switching element T52—the inductor L52—the bank switching element T12—COMA terminal—the piezo-stack INJ1—#1 terminal—the cylinder switching element T11—the detection resistor R11—GND. Conversely, the discharge current flows via the route of GND—the detection resistor R11—the cylinder switching element T11—#1 terminal—the piezo-stack INJ1—the COMA terminal—the bank switching element T12—the inductor L152—the discharging switching element T53—the detection resistor R51.

Figure 2:
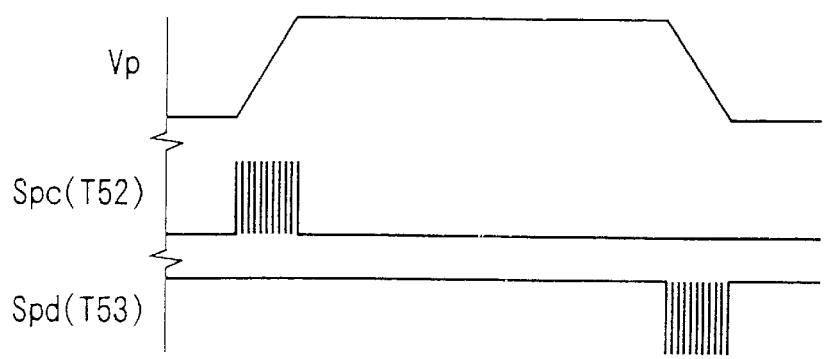
FIG. 2 is a signal diagram showing a switching control method in the embodiment.

In controlling charge/discharge, pulse-like control signals (charge signal/discharge signal) are used in the switching method as shown in FIG. 2. In charging, the charging switching element T52 is controlled to turn on/off (switching) in charging and the discharging switching element T53 is controlled to turn on/off in discharging a plural number of times to thereby attain a predetermined voltage by the controller 4.

For example, in charge control, the controller 4 firstly turns the charging switching element T52 on, and turns the charging switching element T52 off when the charge current detected by the detection resistor R11 or the detection resistor R31 reaches a previously set current value (for example, 10A). After a predetermined OFF period (for example, 10 μs), the charging switching element T52 is turned on to thereby flow a predetermined charge current and the charging switching element T52 is turned off. When the operation is repeated several times (for example, 7 through 8 times) and previously set voltage (for example, 150V) is attained, charging is finished.

The discharging control is attained in the similar manner. Firstly, the discharging switching element T53 is turned on. When the discharge current detected by the detection resistor R51 reaches a previously set current value (for example, 10A), the discharging switching element T53 is turned off. After a predetermined OFF period (for example, 10 μS), the discharging switching element T53 is turned on to thereby flow predetermined charge current and the discharging switching element T53 is turned off. When the operation is repeated several times (for example, 7 through 8 times) and the voltage reaches 0V, discharging is finished.

In this way, the controller 4 caries out a series of charging and discharging control based on the charge current detected by the detection resistor R11 or R31 and the discharge current detected by the detection resistor R51. In this occasion, when charging energy and discharging energy to and from the piezo-stacks INJ1 through INJ4 in one time of switching operation are the same and a charge amount and a discharge amount produced by repeating plural times of switching are the same, the number of times of switching in charging in FIG. 2 (number of times of charging) and the number of times of switching in discharging (number of times of discharging) are equal to each other. That is, the number of times is substantially constant.

The controller 4 is provided with an abnormality detecting circuit 41 as abnormality detecting means. The number of times of charging, the number of times of discharging, or a difference between the number of times of charging and the number of times of discharging are compared with respective prescribed numbers of times thereof at normal time to thereby carry out abnormality determination of the piezo-stacks INJ1 through INJ4 and the charging/discharging circuit.

Figure 3A:
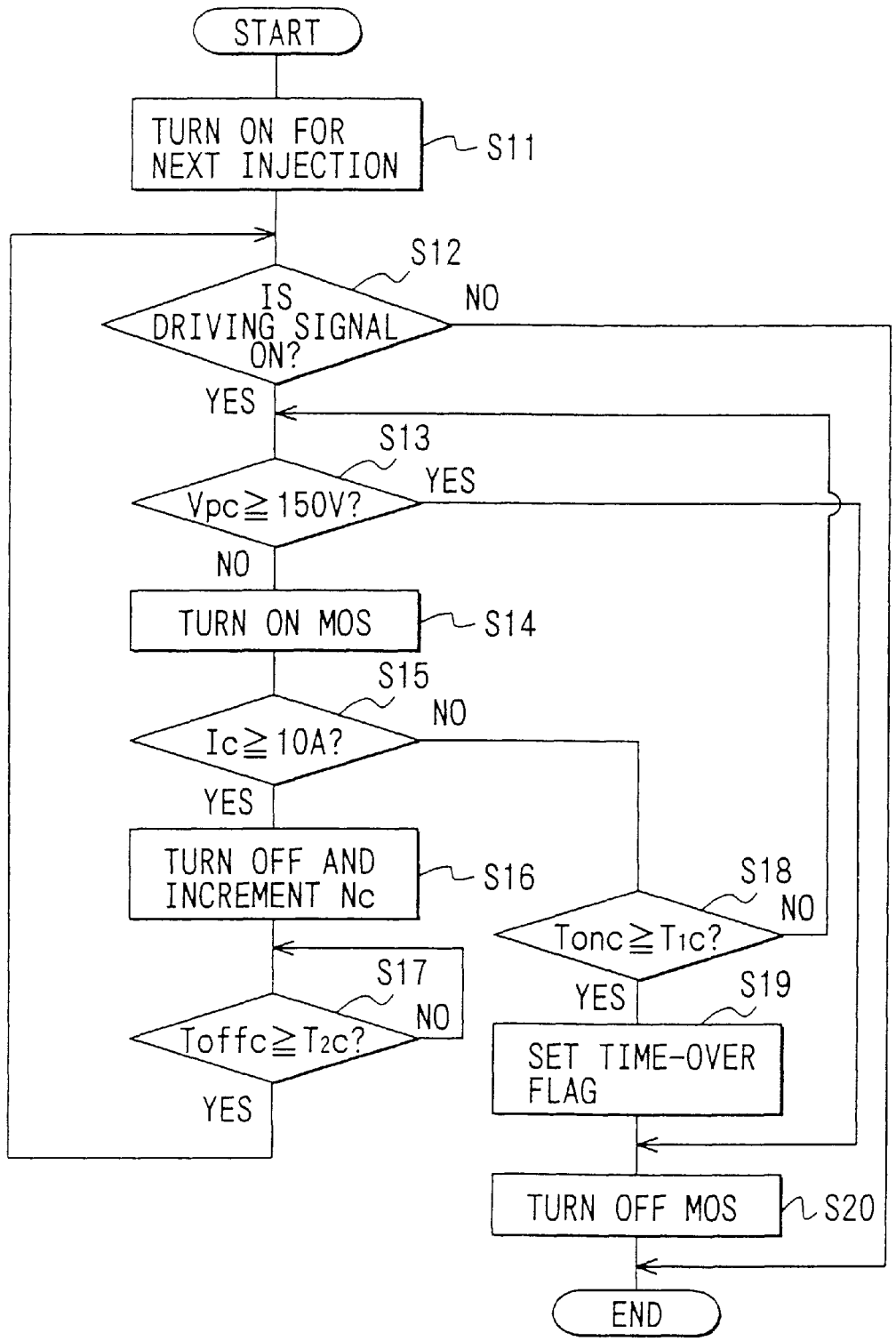
FIGS. 3A–3C are flowcharts showing charging control processing, discharging control processing and abnormality determining processing in the embodiment, respectively.
Figure 3B:
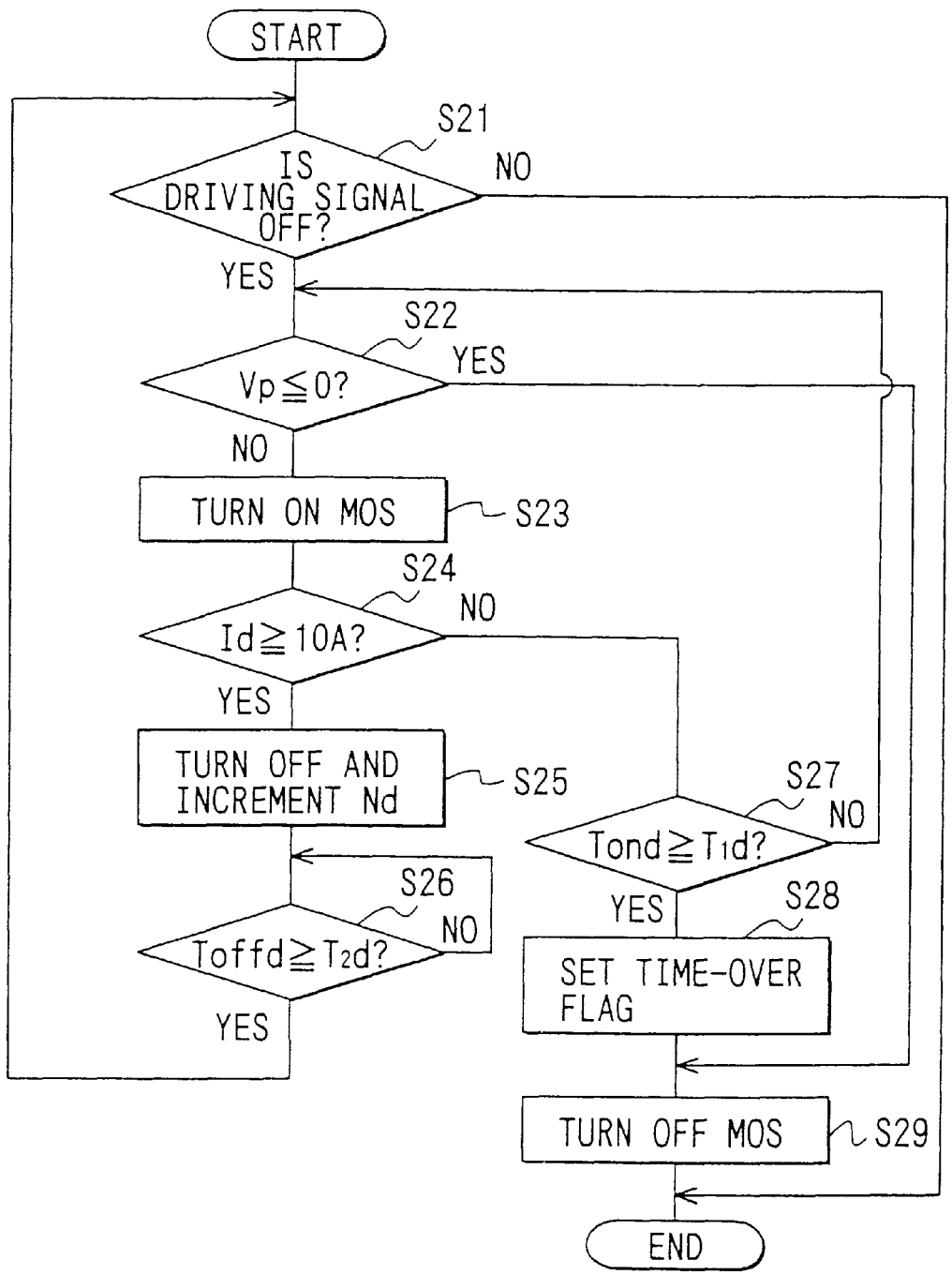
Figure 3C:
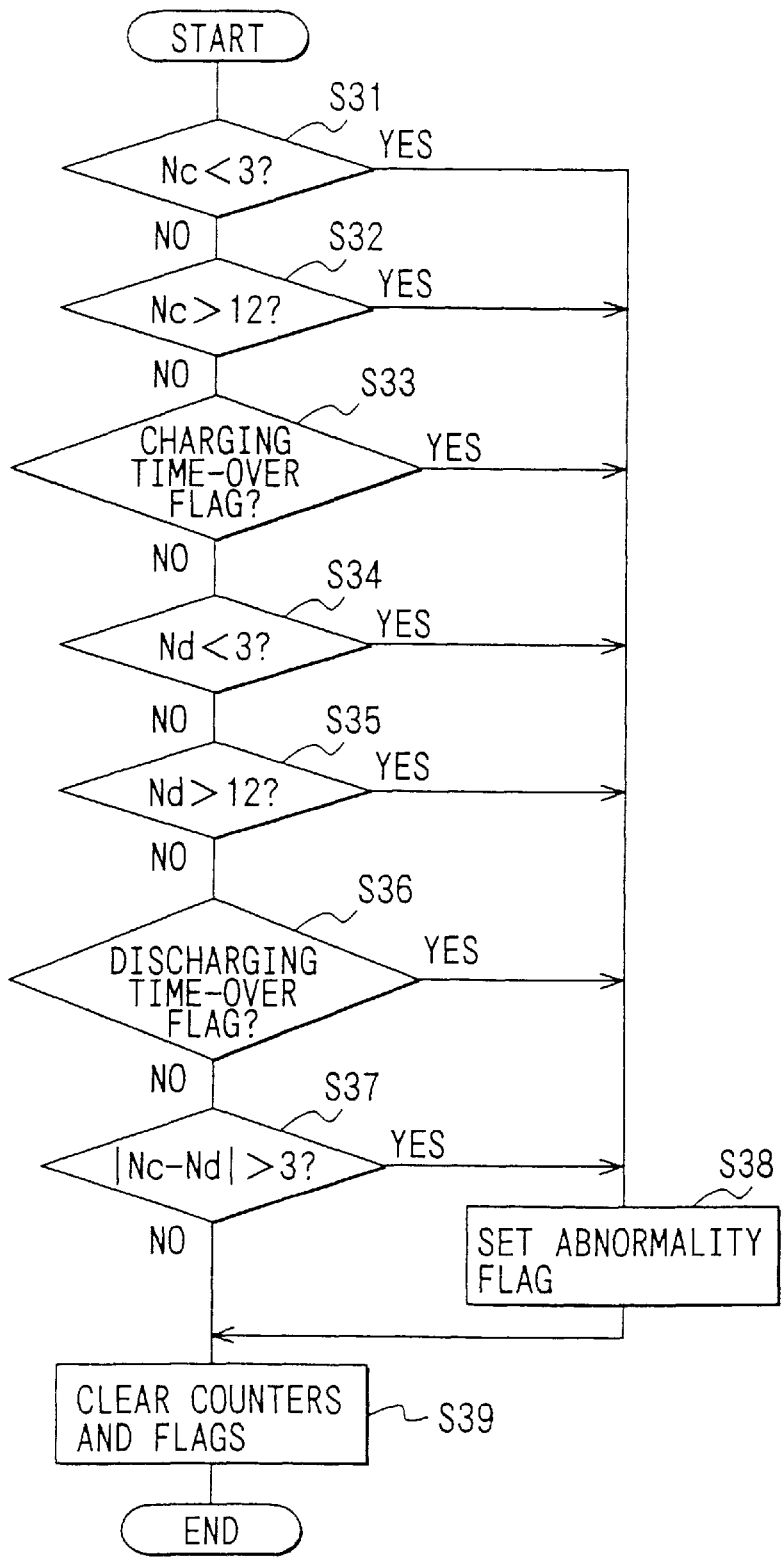

FIGS. 3A—3C illustrate injector control and abnormality detection processing executed by the driving control apparatus 1.

In charging, firstly, at step S11 of FIG. 3A, the bank switching elements T12 and T32 and the cylinder switching elements T11 through T14 in correspondence with the piezo-stacks INJ1 through INJ4 of injectors for carrying out injection at next time are turned on. At step 12, it is determined whether the injector driving signal is turned on (H level) and charging control is finished in the case of OFF (L level). In the case of ON, at step 13, it is determined whether the charging voltage Vpc reaches a target value (for example, 150V). In the case of affirmative determination, the operation proceeds to step 20, the charging switching element T52 is turned off and charging control is finished.

In the case of negative determination, at step 14, the charging switching element T52 is turned on. At step 15, it is determined whether the charging current Ic reaches a predetermined value (for example, 10A). In the case of negative determination, the operation proceeds to step 18. It is determined whether ON-time period Tonc of the charging switching element T52 has elapsed for a predetermined time period T1c or more. In the case of negative determination of step 18, the operation returns to step 13.

In the case of affirmative determination of step 15, at step 16, the charging switching element T52 is turned off, "1" is added to the number NC of charging of a charging time counter. The operation proceeds to step 17 and it is determined whether an OFF-time period Toffc of the charging switching element T52 has elapsed for a predetermined time period T2c (for example, 10 µs) or more. In the case of negative determination of step 17, the operation is repeated until affirmative determination, and thereafter, the operation returns to step 12.

At step 18, when the ON-time period Tonc of the charging switching element T52 reaches the a predetermined time period T1c (for example, 250 ms) or more, even when charging current does not reach the predetermined value, at step 19, an ON-time-over flag of the charging switching element T52 is set. At step 20, the charging switching element T52 is turned off and the charging control is finished.

In discharging processing shown in FIG. 3B, at step 21 it is determined whether the injector drive signal is OFF (L level). In the case of ON (H level), the discharging control is finished. In the case of OFF, at step 22, it is determined whether discharge voltage Vp reaches a target value (for example, 0V). In the case of affirmative determination, the operation proceeds to step 29 and the discharging switching element T53 is turned off. Thus, the discharging control is finished.

In the case of negative determination at step 23, the discharging switching element T53 is turned on. At step 24, it is determined whether discharging current reaches a predetermined value (for example, 10A). In the case of negative determination, the operation proceeds to step 27 and it is determined whether the ON-time period Tond of the discharging element T53 has elapsed for a predetermined time period T1d or more. In the case of negative determination of step 27, the operation returns to step 22.

In the case of affirmative determination of step 24, at step 25, the discharging switching element T53 is turned off, "1" is added to a number Nd of discharge times of a discharge time counter. The operation proceeds to step 26 and it is determined whether an OFF-time period Toffd of the discharging switching element T53 reaches a predetermined time period T2d (for example, 10 µS) or more. In the case of negative determination of step 26, the operation is repeated until affirmative determination. Thereafter, the operation returns to step 21.

At step 27, when the ON-time period Tond of the discharging switching element T53 has continued for the predetermined time period T1d (for example, 250 ms) or more, even when the discharging current does not reach the predetermined value, at step 28, a time-over flag of ON-time period of the discharging switching element T53 is set. At step 29, the discharging switching element T53 is turned off and discharging control is finished.

According to this embodiment, in parallel with the charging/discharging control, abnormality determination by the abnormality detecting circuit 41 is carried out. The abnormality detecting circuit 41 determines an abnormal state by comparing the number of times of charging Nc and the number of times of discharging Nd counted by the charging time counter and the discharging time counter with the numbers of times of charging and discharging at normal time, or from presence or absence of setting of the time-over flag of ON-time of the charging switching element T52 and the time-over flag of ON-time of the discharging switching element T53.

Specifically, the abnormality is determined when the detected numbers of times of charging and discharging are smaller than the number A (=prescribed number of times, for example, 3 times) previously set based on the numbers of times of charging and discharging at normal time (=prescribed numbers of times, for example, 7 through 8 times), or larger than the number B (<prescribed number of times, for example, 12 times), or when a difference between the number of times of charging Nc and the number times Nd of discharging is larger than a number C of times of reference (for example, 3 times). Further, the abnormality is determined, when charging/discharging time periods Tonc and Tond exceed the time period D of reference (for example, 250 ms).

Signal diagrams of FIG. 4 show abnormal states and changes of the numbers of times of charging and discharging of the switching elements T52 and T53 for charging and discharging, monitor voltage of COMA or COMB terminal, detected current (charging/discharging current) of the detection resistors R11, R31 and R51. Further, Table 1 summarizes content and situation of abnormality and method of abnormality determination.

TABLE 1

| Content of Abnormality | Situation in abnormality | Content of Determination |
| --- | --- | --- |
| ON-failure In Cylinder switching MOS | Electricity is conducted to two piezo-injectors, there is a cylinder increasing numbers of times of charging/discharging | Nc > 12, Or Nd > 12 |
| OFF-failure In Cylinder Switching MOS | Piezo cannot be charged (charging/discharging currents do not flow), target voltage is determined to reach without turning charging MOS off | Nc < 3, Or Nd < 3 |
| Short-circuit Of | Current flows but piezo is not charged, | Nc > 12 |

TABLE 1-continued

| Content of Abnormality | Situation in abnormality | Content of Determination |
|---|---|---|
| piezo-stack | voltage applied to piezo is not elevated even by charging | |
| Disconnection of piezo-stack | Piezo cannot be charged (charging current does not flow), target voltage is determined to reach without turning charging MOS off | Nc < 3, Or Nd < 3 |
| Partial disconnection of piezo-stack | Numbers of times of Charging/discharging are Reduced by reduction of piezo-capacitance | Nc < 3, Or Nd < 3 |
| Disconnection of wire | Piezo cannot be charged (charge current does not, flow), target voltage is determined to reach without turning charging MOS off | Nc < 3 Or Nd < 3 |
| GND short-circuit of wire (piezo-upstream) | Piezo cannot be charged (charging current does not flow), Charging MOS is not turned off and applied voltage is not elevated | Tonc is over |
| GND short-circuit of wire (piezo-downstream) | Electricity is conducted to two piezo-injectors, there is cylinder increasing number of times of charging/discharging | Nc > 12, Or Nd > 12 |
| ON-failure of discharge MOS | Charging current to piezo is immediately discharged, Charging MOS is not turned off and applied voltage is not elevated | Tonc is over |
| OFF-failure of discharge MOS | Piezo cannot be discharged (discharge current does not flow), Discharging MOS cannot be turned off and applied voltage is not lowered | Tond is over |
| ON-failure of charge MOS | Piezo is brought into always conducted state, plural switching charging cannot be controlled | Nc < 3, or, Nd > 12 |
| OFF-failure of charge MOS | Piezo cannot be charged, charge current does not flow, Charging MOS cannot be turned on, charging voltage is not elevated | Tonc is over |
| ON-failure of bank switching MOS | Limp home function in short-circuit of wire is not effected, in controlling other bank cylinder, piezo voltage is determined to elevate | Nc < 3 |
| OFF-failure of bank switching MOS | Piezo cannot be charged, current does not flow, charging MOS is not turned off, applied voltage is not elevated | Tonc is over |
| Contact failure | Charged/discharged without control by interrupted contact, Numbers of times of charging and discharging are reduced | Nc < 3, Nd < 3, Or \|Nc − Nd\| > 3 |
| Current leakage of Piezo-stack | From leakage of current of piezo applied voltage, number of times of charging is increased, number of times of discharging is reduced | \|Nc − Nd\| > 3 |
| Leakage of charge MOS | From leakage of piezo charging current, number of times of charging is reduced, number of times of discharging is increased | \|Nc − Nd\| > 3 |
| Leakage Of discharge MOS | From leakage of piezo discharging current, number of times of charging is increased, number of times of discharging is reduced | \|Nc − Nd\| > 3 |

Figure 4A:
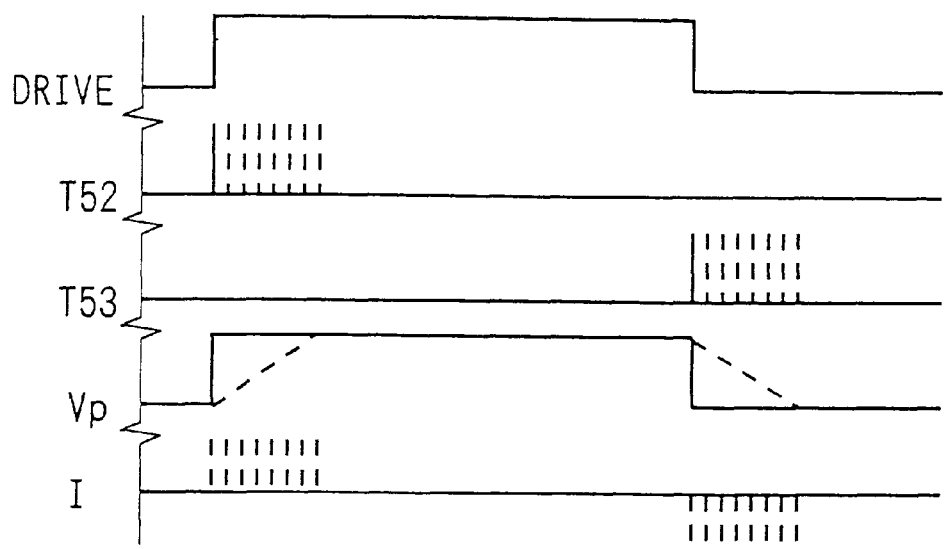
FIGS. 4A–4D are signal diagrams showing OFF-failure of a cylinder switching element, disconnection of a piezo-stack and the like, ON-failure of a cylinder switching element, OFF-failure of a charging switching element and the like, and a state in leakage of current of the piezo-stack.

FIG. 4A shows a case of OFF-failure (continuation of OFF-state) of the cylinder switching elements T11 through T41, disconnection of piezo-stacks INJ1 through INJ4, or disconnection of wire. In such a case, charging/discharging current I does not flow and the piezo-stacks INJ1 through INJ4 cannot be charged. In this case it is determined that the monitor voltage Vp (bold line) at the COM (COMA or COMB) terminal is not elevated in steps as in normal time (one-dotted chain line) but is elevated rapidly by turning the charging/discharging switching elements T52 and T53 on. Therefore, the monitor voltage Vp reaches the target voltage without turning the charging switching element T52 off.

As shown in table 1, even when the piezo-stacks INJ1 through INJ4 are partially disconnected, due to a reduction in piezo-capacitance, it is determined that the target voltage is attained even by a small number of times of charging/discharging. When the number of times of charging Nc or the number of times of discharging Nd is considerably smaller than the prescribed number of times, specifically, when the number of times of charging Nc or the number of times of discharging Nd is smaller than 3 times (number A of times of reference), it can be determined that abnormality of any of these is caused.

Figure 4B:
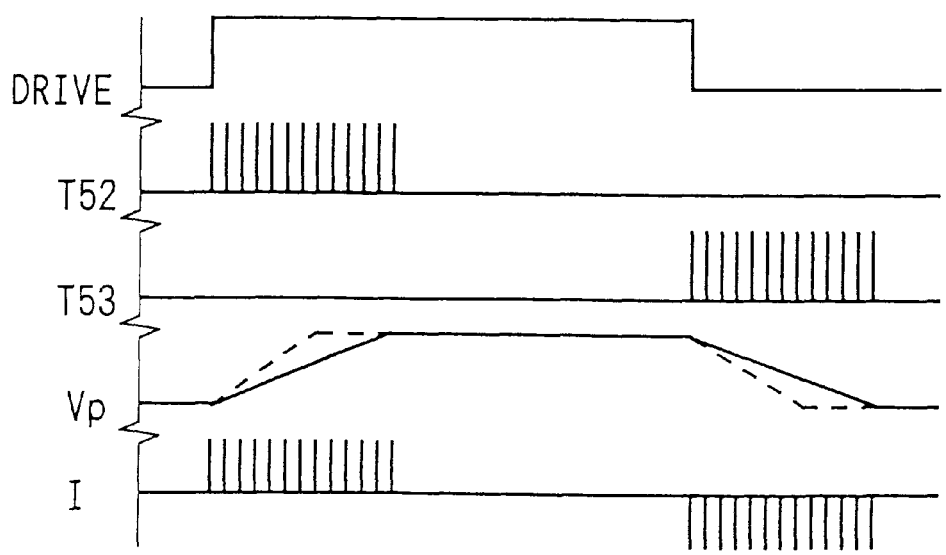

FIG. 4B shows a case of ON-failure (continuation of ON-state) of the cylinder switching elements T11 through T41. For example, in ON-failure of the cylinder switching element T11 of #1 cylinder, when the piezo-stack INJ2 of #2 cylinder controlled by the same bank switching element T12 is controlled to charge/discharge, electricity is conducted to the two piezo-stacks INJ1 and INJ2. Therefore, rise of the monitor voltage Vp at the COM terminal is delayed and the number of times of charging/discharging is increased.

Further, as in Table 1, when the piezo-stacks INJ1 through INJ4 are short-circuited, although current flows, the piezo-stacks are not charged. Therefore, the monitor voltage Vp is not elevated and the number of times of charging Nc is increased. Also in the case of short-circuit at GND of wire downstream from the piezo-stacks INJ1 through INJ4, electricity is conducted to the two piezo-stacks and there is a cylinder in which the number of times Nc, Nd of charging/discharging is increased. When the number of times of charging Nc or the number of times of discharging Nd is considerably larger than the prescribed number of times, specifically when the number of times of charging Nc or the number of times of discharging Nd is larger than 12 times (number B of times of reference), it can be determined that abnormality is caused.

Figure 4C:
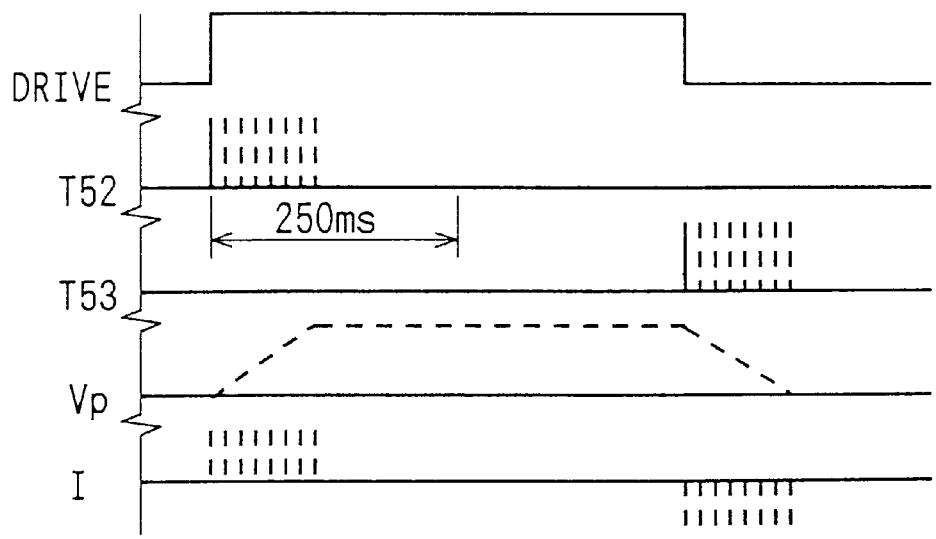

FIG. 4C shows a case of OFF-failure (continuation of OFF-state) of the charging switching element T52, or the bank switching element T12 or T32, charge current Ic does not flow to the piezo-stacks INJ1 through INJ4, charge current Ic does not reach the predetermined value even when the reference time period D (for example, 250 ms) is exceeded. Therefore, the charging time period Tc is over.

Similarly, as shown in Table 1, in the case of OFF-failure of the discharging switching element T53, the discharging time period Tond is over. In ON-failure of the discharging switching element T53, electricity is discharged immediately after charging, and the monitor voltage Vp is not elevated. Therefore, the charging time period Tonc is over. In the case of causing short-circuit to GND of wire upstream from the piezo-stacks INJ1 through INJ4, the charge current Ic to the piezo-stacks INJ1 through INJ4 does not flow, the charging switching element T52 is not turned off, and the monitor voltage Vp is not elevated. Therefore, the charging time period Tonc is over. When the charging time period Tonc or the discharging time period Tond is over, it can be determined that abnormality is caused.

Figure 4D:
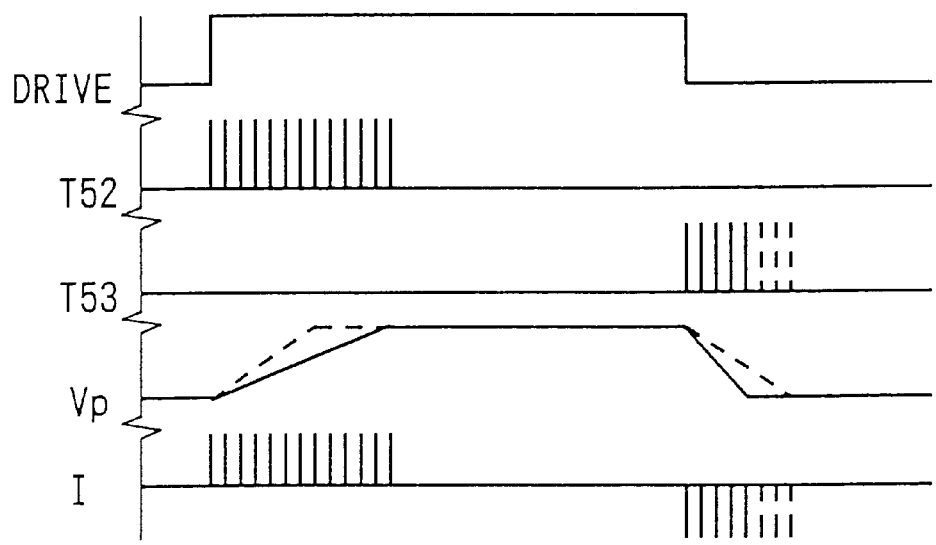

FIG. 4D shows a case of leakage of current at the piezo-stacks INJ1 through INJ4. In charging, rise of the monitor voltage Vp is delayed due to leakage of current, the number of times of charging Nc becomes larger than the prescribed number of times. In discharging, conversely, fall of the monitor voltage is accelerated and the number of times of charging Nc becomes larger than the prescribed number of times.

Similarly, as shown in Table 1, even in the case of leakage of current at the discharging switching element T53, the number of times of charging Nc is increased and the number of times of discharging Nd is reduced. Further, in the case of leakage of current at the charging switching element T52, the number of times of charging Nc is reduced and the number of times of discharging Nd is increased. When a difference between the number of times of charging Nc and the number of times of discharging Nd is large, in this case, |Nc–Nd| is larger than 3 times (number C of times of reference), it can be determined that abnormality is caused.

Further, in the case of ON-failure (continuation of ON-state) at the charging switching elements T52 and T53, the conducted state always exists. Therefore, charging control by the switching method becomes difficult and the number of times of charging Nc becomes smaller than 3 times (number A of times of reference) or the number of times of discharging Nd becomes larger than 12 times (number B of times of reference).

Further, in the case of ON-failure (continuation of ON-state) at the bank switching element T12 and T32, a limp home function in short-circuit-of wire is not effected. When a cylinder at other bank is controlled, it is determined that the monitor voltage Vp is elevated. In this case, the number of times of charging Nc becomes smaller than 3 times (number A of times of reference).

Further, when contact failure is caused, by interrupted contact, charging/discharging is carried out. Therefore, the number of times of charging/discharging Nc, Nd becomes smaller than 3 times (number A of times of reference), or the difference |Nc–Nd| becomes larger than 3 times (number C of times of reference).

In this way, all of various abnormalities which may occur can be detected by comparison with the predetermined references A through C or the reference time period D.

FIG. 3C is a flowchart of an abnormality determining processing. At step S31, it is determined whether the number of times of charging Nc is smaller than 3 times. In the case of negative determination, at step S32, it is determined whether the number of times of charging Nc is larger than 12 times. In the case of negative determination of step S32, at step S33, presence or absence of setting the time-over flag of the charging time period is confirmed.

When the time-over flag is not set, at step S34, it is determined whether the number of times of discharging Nd is smaller than 3 times. In the case of negative determination, at step S35, it is determined whether the number of times of discharging Nd is larger than 12 times. In the case of negative determination of step S35, at step S36, presence or absence of setting of the time-over flag of the discharging time period is confirmed.

When the time-over flag is not set, at step S37, it is determined whether |number of times of charging Nc—number of times of discharging Nd| is larger than 3 times. In the case of negative determination of step S37, it is determined that abnormality is not caused at step S39. The various time counters for counting the numbers of times of charging/discharging and the like and the time-over flags are cleared, thus finishing the abnormality determining processing.

In the case of affirmative determination of any of step S31 through step S37, it is determined that abnormality is caused. The operation proceeds to step S38 and the abnormality determining processing is finished.

As described above, the invention is applied to the piezo-injector driving apparatus and can easily detect abnormality of the piezo-actuators or the charging/discharging circuits. A number of circuits in correspondence to the number of abnormalities are not needed, the plurality of abnormalities can be detected comparatively simply.

The present invention should not be limited to the disclosed embodiment, but may be implemented in other ways without departing from the spirit of the invention.

What is claimed is:

1. A driving apparatus for a piezo-actuator comprising:

charging/discharging means for applying a high voltage to the piezo-actuator when a charging switching element is turned on and discharging electric charge accumulated in the piezo-actuator when a discharging switching element is turned on;

controlling means for controlling to turn the charging or the discharging switching element on/off by outputting a charge signal and a discharge signal to the charging/discharging means for repeating a switching operation in charging or discharging to thereby attain a predetermined piezo-actuator voltage; and abnormality detecting means for detecting abnormality by detecting at least one of numbers of times of repetition of switching in charging and in discharging and charging/discharging time periods and comparing a detection result with a reference in normal time.

2. The driving apparatus according to claim 1, wherein the abnormality detecting means determines the abnormality when the numbers of times of switching in charging and in discharging are smaller than a first reference or larger than a second reference, when a difference between the number of times of switching in charging and the number of times of switching in discharging is larger than a third reference, or when the charging/discharging time period exceeds a fourth reference.

3. The driving apparatus according to claim 1, wherein the controlling means controls to turn the charging or the discharging switching element on/off such that a value of charge current and a value of discharge current flowing in one time of the switching operation become equal to each other.

* * * * *